(12) United States Patent
Fröberg Olsson et al.

(10) Patent No.: US 10,396,931 B2
(45) Date of Patent: Aug. 27, 2019

(54) FIRST NETWORK NODE, SECOND NETWORK NODE AND METHODS FOR TRANSMITTING AND RECEIVING A PROTOCOL DATA UNIT

(71) Applicant: Telefonaktiebolaget LM Ericsson (publ), Stockholm (SE)

(72) Inventors: Jonas Fröberg Olsson, Ljungsbro (SE); Olle Rosin, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 4 days.

(21) Appl. No.: 15/520,585

(22) PCT Filed: Nov. 20, 2014

(86) PCT No.: PCT/SE2014/051389
§ 371 (c)(1),
(2) Date: Apr. 20, 2017

(87) PCT Pub. No.: WO2016/080877
PCT Pub. Date: May 26, 2016

(65) Prior Publication Data
US 2017/0310421 A1 Oct. 26, 2017

(51) Int. Cl.
*H04L 1/00* (2006.01)
*H04L 12/46* (2006.01)
(Continued)

(52) U.S. Cl.
CPC .......... *H04L 1/0007* (2013.01); *H04L 1/0083* (2013.01); *H04L 1/165* (2013.01);
(Continued)

(58) Field of Classification Search
None
See application file for complete search history.

(56) References Cited

U.S. PATENT DOCUMENTS 7,768,961 B2 * 8/2010 Pragada ................ H04W 28/06
370/328
8,638,773 B2 1/2014 Ho et al.
(Continued)

FOREIGN PATENT DOCUMENTS

WO WO2013/086362 6/2013

OTHER PUBLICATIONS

3GPP ETSI TS 136 322 V11.0.0 (Oct. 2012), LTE; Evolved Universal Terrestrial Radio Access (E-UTRA); Radio Link Control (RLC) Protocol Specification (3GPP TS 36.322 version 11.0.0 Release 11). (Year: 2012).*
(Continued)

*Primary Examiner* — Jamaal Henson
(74) *Attorney, Agent, or Firm* — Sage Patent Group

(57) ABSTRACT

A method performed by a first network node, for transmitting a RLC UM, PDU, to a second network node is provided. The first network node and second network node operate in a wireless communications network. When detected that the RLC UM PDU has failed to be transmitted over a first channel, the first network node decides to redirect the RLC UM PDU to be transmitted over a second channel. The first network node divides the RLC UM PDU into two or more re-segmented RLC UM PDUs. The first network node then transmits the re-segmented RLC UM PDUs to the second network node over the second channel. Each re-segmented RLC UM PDU comprises the following indications:
 (a) that the re-segmented RLC UM PDU is re-segmented,
 (b) an order indicator related to the re-segmented RLC UM PDU, and
 (c) whether or not the re-segmented RLC UM PDU is a last re-segmented RLC UM PDU out of the two or more re-segmented RLC UM PDUs.

17 Claims, 12 Drawing Sheets

(51) Int. Cl.
    *H04L 1/18*     (2006.01)
    *H04L 1/16*     (2006.01)
    *H04W 80/02*     (2009.01)

(52) U.S. Cl.
    CPC .......... *H04L 1/1685* (2013.01); *H04L 1/1812* (2013.01); *H04L 1/1874* (2013.01); *H04L 12/4625* (2013.01); *H04L 1/1835* (2013.01); *H04L 1/1848* (2013.01); *H04L 2001/0092* (2013.01); *H04W 80/02* (2013.01)

(56) References Cited

U.S. PATENT DOCUMENTS

| | | | |
|---|---|---|---|
| 8,873,471 B2 | 10/2014 | Ho | |
| 2003/0169708 A1* | 9/2003 | Harris | H04L 1/0001 370/335 |
| 2005/0270996 A1* | 12/2005 | Yi | H04L 1/1841 370/312 |
| 2009/0296625 A1* | 12/2009 | Wu | H04L 1/0007 370/315 |
| 2015/0215827 A1* | 7/2015 | Zhang | H04W 28/0247 370/331 |

OTHER PUBLICATIONS

3GPP ETSI TS 136 322 V 11.0.0 (Oct. 2012), LTE; Evolved Terrestrial Radio Access (E-UTRA); Radio Link Control (RLC) Protocol Specification (3GPP TS 36.322 version 11.0.0 Release 11). (Year: 2012).*

3GPP ETSI TS 136 322 V 11.0.0 (Oct. 2012), LTE; Evolved Terrestrial Radio Access (E-UTRA); Radio Link Control (RLC) Protocol Specification (3GPP TS 36.322 Ver. 11.0.0 Rel. 11) (Year: 2012).*

International Search Report and Written Opinion of the International Searching Authority for International Application No. PCT/SE2014/051389 (dated Aug. 14, 2015).

ETSI TS 136 322 V11.0.0, "LTE; Evolved Universal Terrestrial Radio Access (E-UTRA); Radio Link Control (RLC) protocol specification (3GPP TS 36.322 version 11.0.0 Release 11)," pp. 1-42 (Oct. 2012).

Ericsson, "Comparison of intra-bearer UP architectures," R2-133416, 3GPP TSG-RAN WG2 Meeting #83bis, pp. 1-5 (Oct. 11, 2013).

Supplementary European Search Report for EP 14906263.0, dated Oct. 19, 2017, 4 pages.

* cited by examiner

| R1 | R1 | FI | E | SN |
|---|---|---|---|---|
| | | SN | | |
| E | LI_1 | | | |
| | | | E | LI_2 |
| | LI_2 | | | |
| | ... | | | |

Oct 1, Oct 2, Oct 3, Oct 4, Oct 5

<- Prior art header

Fig. 5

| R1 | SI | FI | E | SN |
|---|---|---|---|---|
| | | SN | | |
| | | SSN | | |
| LS | LI_1 | LI_1 | E | LI_2 |
| E | | | | |
| | | | | LI_2 |
| | | | | ... |

Oct 1, Oct 2, Oct 3, Oct 4, Oct 5, Oct 6

<- Modified header

FIRST NETWORK NODE, SECOND NETWORK NODE AND METHODS FOR TRANSMITTING AND RECEIVING A PROTOCOL DATA UNIT

CROSS REFERENCE TO RELATED APPLICATION

This application is a 35 U.S.C. § 371 national stage application of PCT International Application No. PCT/SE2014/051389, filed on Nov. 20, 2014, the disclosure and content of which is incorporated by reference herein in its entirety.

TECHNICAL FIELD

Embodiments herein relate to a first network, a second network node and methods therein. In particular, it relates to transmitting and receiving a Radio Link Control Unacknowledged Mode Protocol Data Unit (RLC UM PDU).

BACKGROUND

Wireless devices for communication such as terminals are also known as e.g. User Equipments (UE), mobile terminals, wireless terminals and/or mobile stations. Wireless devices are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server, such as server providing video streaming service, via a Radio Access Network (RAN) and possibly one or more core networks, comprised within the cellular communications network.

Wireless devices may further be referred to as mobile telephones, cellular telephones, computers, or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

A cellular communications network covers a geographical area which is divided into cell areas, wherein each cell area being served by a base station, e.g. a Radio Base Station (RBS), which sometimes may be referred to as e.g. eNodeB (eNB), NodeB, B node, Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Each cell may further comprise one or more antenna sites e.g. forming a combined cell or soft cell. Further, each base station may support one or several communication technologies. The base stations communicate over the air interface operating on radio frequencies with the wireless devices within range of the base stations also referred to as transmitter-receiver pairs. In the context of this disclosure, the expression Downlink (DL) is used for the transmission path from the base station to a wireless device. The expression Uplink (UL) is used for the transmission path in the opposite direction i.e. from the wireless device to the base station.

In 3rd Generation Partnership Project (3GPP) Long Term Evolution (LTE), base stations, which may be referred to as eNodeBs or even eNBs, may be directly connected to one or more core networks.

Universal Mobile Telecommunications System (UMTS) is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for terminals. The 3GPP has undertaken to evolve further the UTRAN and GSM based radio access network technologies.

3GPP LTE radio access standard has been written in order to support high bitrates and low latency both for uplink and downlink traffic. All data transmission is in LTE is controlled by the radio base station.

License-Assisted Access via LTE (LAA-LTE) has recently been proposed as a technology for co-existence on unlicensed carriers with, e.g., WiFi. On an unlicensed carrier all data transmissions are to be controlled by a Listen-Before-Talk (LBT) mechanism, while control and management signaling may be sent without LBT. The LBT is a functionality which means that a channel such as an unlicensed channel is assessed to be clear before transmission begins.

Radio Link Control (RLC) Unacknowledged Mode (UM) is typically used for transmission of data between a node in a radio access network such as an eNB, and a UE, where the data packets are desired to be delivered in order and where RLC AM re-transmissions causes unacceptable long delays. UM is often used for time critical applications, for instance video streaming services, where delays due to RLC retransmissions cause larger degradation of the end user experience than packet loss. Therefore, current RLC UM protocol does neither support re-transmission nor re-segmentation.

Using an Unlicensed LTE carrier (ULC), for a time-critical and data packet order-critical service, UM Protocol Data Unit (PDU)s typically have to be produced before LBT is initiated. Thus if the ULC is occupied by other transmissions, some of the produced PDUs cannot be sent and will be discarded. Discarded PDUs can be re-produced to be transmitted at a later time, but these transmission re-attempts need to occur within a certain time budget from first attempt depending on the application's latency requirement Since UnLicensed Channel (ULC) access is unpredictable, some packets may be entirely discarded due to that ULC is occupied during the whole time budget for these packets. These discarded RLC UM PDUs will cause too high application packet loss rate causing significant degradation of user experience. For example, if RLC UM PDUs carries streaming video packets, then even a rather small amount of RLC UM packet loss can cause freezing video too and/or cause re-buffering.

It may be possible to use RLC AM protocol for time-critical application packet, but that would introduce RLC re-transmissions and larger RLC protocol overhead. RLC AM re-transmissions will not be beneficial for time-critical applications since a RLC AM re-transmission timers operate on a larger time-scale than the time budget and also that RLC AM cause additional overhead since receiver of the PDUs need to send status PDUs to sender.

SUMMARY

It is therefore an object of embodiments herein to provide an improved way of handling PDUs in a wireless communications network.

According to a first aspect of embodiments herein, the object is achieved by a method performed by a first network node, for transmitting a Radio Link Control, RLC, Unacknowledged Mode, UM, Protocol Data Unit, PDU, to a second network node. The first network node and second network node operate in a wireless communications network. The wireless communications network provides a first channel and a second channel. When detected that the RLC UM PDU has failed to be transmitted over the first channel, the first network node decides to redirect the RLC UM PDU to be transmitted over the second channel. The RLC UM PDU is too large to be sent in a single transmission over the second channel. The first network node divides the RLC UM PDU into two or more re-segmented RLC UM PDUs. The first network node then transmits the two or more re-segmented RLC UM PDUs to the second network node over the second channel. Each re-segmented RLC UM PDU comprises the following indications:
  (a) that the PDU is re-segmented,
  (b) an order indicator related to the re-segmented RLC UM PDU, and
  (c) whether or not the re-segmented RLC UM PDU is a last re-segmented RLC UM PDU out of the two or more re-segmented RLC UM PDUs.

According to a second aspect of embodiments herein, the object is achieved by a method performed by a second network node for receiving two or more re-segmented RLC, Unacknowledged Mode, UM, Protocol Data Unit, PDUs from a first network node. The second network node and first network node operate in a wireless communications network. The wireless communications network provides a first channel and a second channel. The second network node receives two or more re-segmented RLC UM PDUs from the first network node over the second channel. Each re-segmented RLC UM PDU comprises the following indications:
  (a) that the PDU is re-segmented,
  (b) an order indicator related to the re-segmented RLC UM PDU, and
  (c) whether or not the re-segmented RLC UM PDU is a last re-segmented RLC UM PDU out of the two or more re-segmented RLC UM PDUs.

The second network node re-assembles the two or more re-segmented RLC UM PDUs into a RLC UM SDU based on the indications.

According to a third aspect of embodiments herein, the object is achieved by a first network node for transmitting a Radio Link Control, RLC, Unacknowledged Mode, UM, Protocol Data Unit, PDU, to a second network node. The first network node and the second network node are adapted to operate in a wireless communications network. The wireless communications network is configured to provide a first channel and a second channel. The first network node is configured to, when detected that the RLC UM PDU has failed to be transmitted over the first channel, decide to redirect the RLC UM PDU to be transmitted over the second channel. The RLC UM PDU is too large to be sent in a single transmission over the second channel. The first network node is further configured to divide the RLC UM PDU into two or more re-segmented RLC UM PDUs. The first network node is further configured to transmit the two or more re-segmented RLC UM PDUs to the second network node over the second channel. Each re-segmented RLC UM PDU is arranged to comprise the following indications:
  (a) that the PDU is re-segmented,
  (b) an order indicator related to the re-segmented RLC UM PDU, and
  (c) whether or not the re-segmented RLC UM PDU is a last re-segmented RLC UM PDU out of the two or more re-segmented RLC UM PDUs.

According to a forth aspect of embodiments herein, the object is achieved by a second network node, for receiving two or more re-segmented RLC, Unacknowledged Mode, UM, Protocol Data Unit, PDUs from a first network node. The second network node and first network node are adapted to operate in a wireless communications network. The wireless communications network is configured to provide a first channel and a second channel. The second network node is configured to receive two or more re-segmented RLC UM PDUs from the first network node over the second channel. Each re-segmented RLC UM PDU is arranged to comprise the following indications:
  (a) that the PDU is re-segmented,
  (b) an order indicator related to the re-segmented RLC UM PDU, and
  (c) whether or not the re-segmented RLC UM PDU is a last re-segmented RLC UM PDU out of the two or more re-segmented RLC UM PDUs.

The second network node is further configured to re-assemble the two or more re-segmented RLC UM PDUs into a RLC UM SDU based on the indications.

An advantage with embodiments herein is that the end user experience will degrade less when UM PDUs are not discarded if the ULC cannot be accessed, since RLC UM PDUs may e.g. be sent on a licensed more predictable carrier even though the licensed carrier has lower bandwidth or has worse radio conditions than the ULC.

BRIEF DESCRIPTION OF THE DRAWINGS

Examples of embodiments herein are described in more detail with reference to attached drawings in which:

FIG. 5 is a schematic diagram illustrating prior art.

FIG. 6 is a schematic diagram illustrating embodiments herein.

DETAILED DESCRIPTION

As part of developing embodiments herein, a problem will first be identified and shortly discussed.

Since UnLicensed Channel (ULC) access is unpredictable as mentioned above, the number of discarded packets may be very high. One possible solution to avoid loss of packets would be to re-direct the PDUs to a licensed LTE carrier. This would be possible if the UM PDU is small enough to fit on the licensed LTE carrier. If the UM PDU is too large then transmissions on the licensed carrier will likely fail resulting in a loss of the PDU unless the PDUs are re-segmented into smaller PDUs. Since RLC Acknowledge Mode (AM) supports PDU re-segmentation a possible way to solve the problem would be to change from UM to AM. AM of course solves the re-segmentation problem which enable sending the re-directed PDU in smaller pieces, but this comes to the price of additional overhead. An AM header include bits for AM functionality that relates to retransmission, and sophisticated re-segmentation functionality that provide no positive performance impact for a delay sensitive application.

Also an option to drop the PDU and rely on a re-transmission protocol on top of RLC protocol is not beneficial since such a solution could cause severe degradation of user experience where delays due to RLC retransmissions cause larger degradation of the end user experience than packet loss as mentioned above.

This problem may also appear in licensed carriers, for instance in carrier aggregations with shared carriers where the network does not have full control of Quality of Service (QoS).

Figure 1:
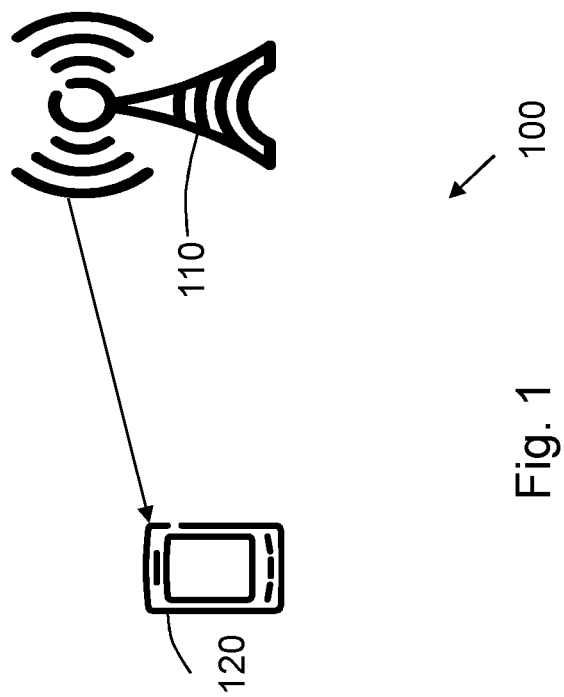
FIG. 1 is a schematic block diagram illustrating a wireless communications network.

FIG. 1 depicts a wireless communications network 100 in which embodiments herein may be implemented. The wireless communications network 100 is comprises radio networks such as LTE, Licensed Assisted Access (LAA)-LTE, WCDMA, Wimax, WiFi, Wireless Local Area Network (WLAN) networks or any other radio network or system. In some embodiments, the access to the ULC is controlled by a listen-before-talk (LBT) mechanism.

The wireless communications network 100 provides at least two types of channels, a first channel and a second channel. The first channel may e.g. be an Unlicensed Channel (ULC) such as an Unlicensed LTE carrier, or a Licenced Channel (LC). The second channel may also be a ULC such as an Unlicensed LTE carrier, or an LC. In one particular embodiment the first channel is a ULC such as an Unlicensed LTE carrier and the second channel is an LC. In some embodiment the bandwidth of the first channel is larger than the bandwidth of the second channel. In other embodiments that radio quality is worse on second channel than the first channel.

A plurality of network nodes operates in the wireless communications network 100, whereof only two, a first network node 110 and a second network node 120 are depicted in FIG. 1 for simplicity. In example embodiments herein the first network node 110 is represented by a base station and the second network node 120 is represented by a user equipment. However, it may also be the other way around, i.e. first network node 110 is represented by a user equipment and the second network node 120 is represented by a base station.

When the first network node 110 and the second network node 120 is represented by a base station, the base station may be referred to as a transmission point and may in some embodiments be a network node referred to as, eNodeB (eNB), NodeB, B node, Base Transceiver Station (BTS), AP (Access Point) or a Home Node B, a Home eNodeB depending on the technology and terminology used, or any other network node capable to communicate with a wireless device with wireless capability, or any other radio network unit capable to communicate over a radio link in a wireless communications network.

When the first network node 110 and the second network node 120 is represented by a user equipment which is, in the example scenario of FIG. 1, served by the base station, the user equipment may e.g. be a wireless device, a mobile wireless terminal, a mobile phone, a computer such as e.g. a laptop, or tablet computer, sometimes referred to as a surf plate, with wireless capabilities, or any other radio network unit capable to communicate over a radio link in a wireless communications network. Please note the term user equipment used in this document also covers other wireless terminals such as Machine to Machine (M2M) devices.

RLC and RLC UM PDU

Embodiments herein use the RLC protocol in UM mode. The UM mode of RLC provides no re-transmission functionality and is suitable for delay sensitive traffic such as streaming traffic.

UM mode of RLC provides according to embodiments herein re-segmentation and reassembly of an RLC UM, PDU. A header of the RLC UM, PDU provides indications according to embodiments herein. Please note that State of the art RLC UM provides segmentation functionality, but not re-segmentation functionality. Once a RLC UM PDU comprises one or more segments of packets above RLC, a state-of-the-art RLC UM PDU cannot be re-segmented onto two or more PDUs that together comprise all the segments contained in the original PDU.

In the LTE user-plane protocol stack, RLC is the protocol above the Medium Access Control (MAC) protocol and below the Packet Data Convergence Protocol (PDCP). The RLC is implemented in the first network node 110 and the second network node 120

Unlicensed Carrier and Licensed Carrier

According to embodiments herein an RLC UM, PDU may be transmitted on an unlicensed carrier and a licensed carrier. As mentioned above when a data is transmitted on an unlicensed carrier it need typically to be controlled by a Listen-Before-Talk (LBT) mechanism, while a small amount of control and management signaling may be sent without LBT. A licensed carrier is a carrier that one single operator is permitted to use, which means that the network operated by the operator has full access control to the media. For an un-licensed carrier, however, is permitted to be used by anyone provided that certain rules also referred to as regulations are followed, among one rule is that a LBT mechanism is required. Without the regulated LBT mechanism such an un-licensed carrier would be almost impossible to communicate on due to that the different networks tries to access the medium in an un-coordinated manner.

When using a high speed Unlicensed LTE carrier (ULC), for a time and data packet order critical service, RLC UM PDUs have to be produced before control of the channel can be achieved.

Embodiments herein provides re-Segmentation of RLC UM PDUs

According to embodiments herein, the RLC UM PDU header is modified to allow for RLC UM PDU re-segmentation.

Embodiments herein, which e.g. are applicable to a LAA-LTE system, provides a modified RLC UM PDU header enabling RLC UM PDUs that cannot be sent over one channel such as e.g. a ULC can be redirected to another channel such as e.g. an LC even if the LC capacity is lower than ULC capacity.

Figure 2:
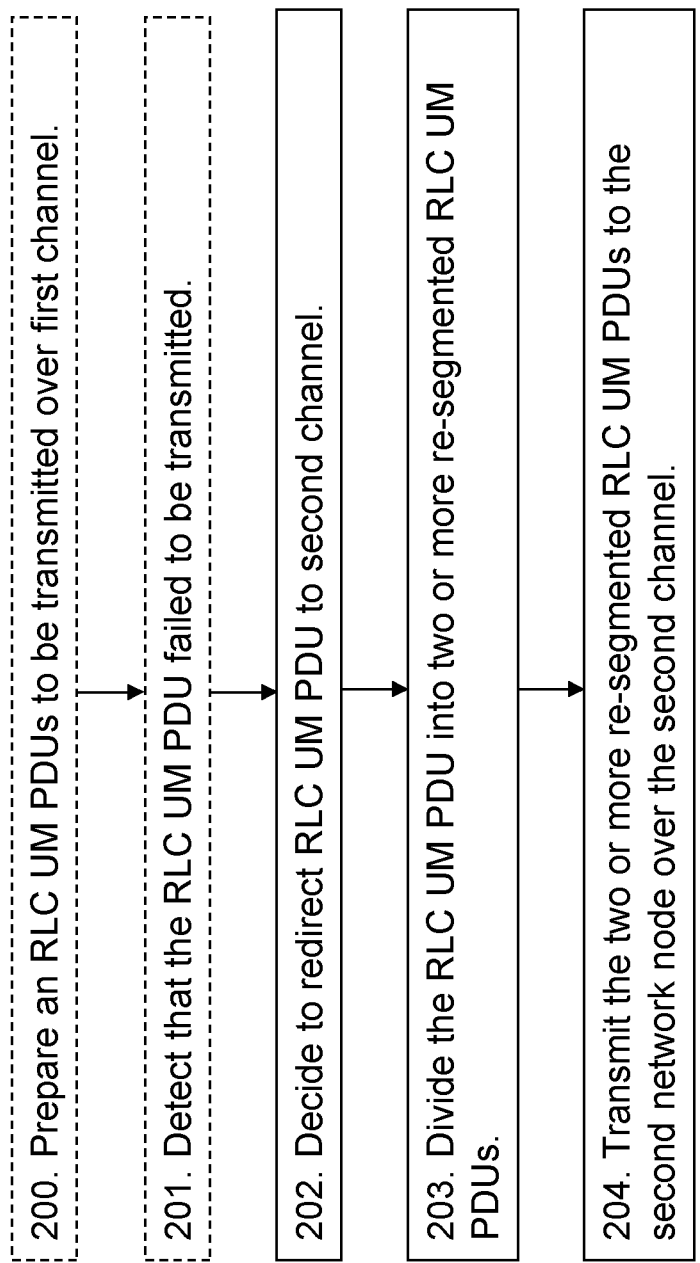
FIG. 2 is a flowchart depicting embodiments of a method in a first network node.
Figure 3:
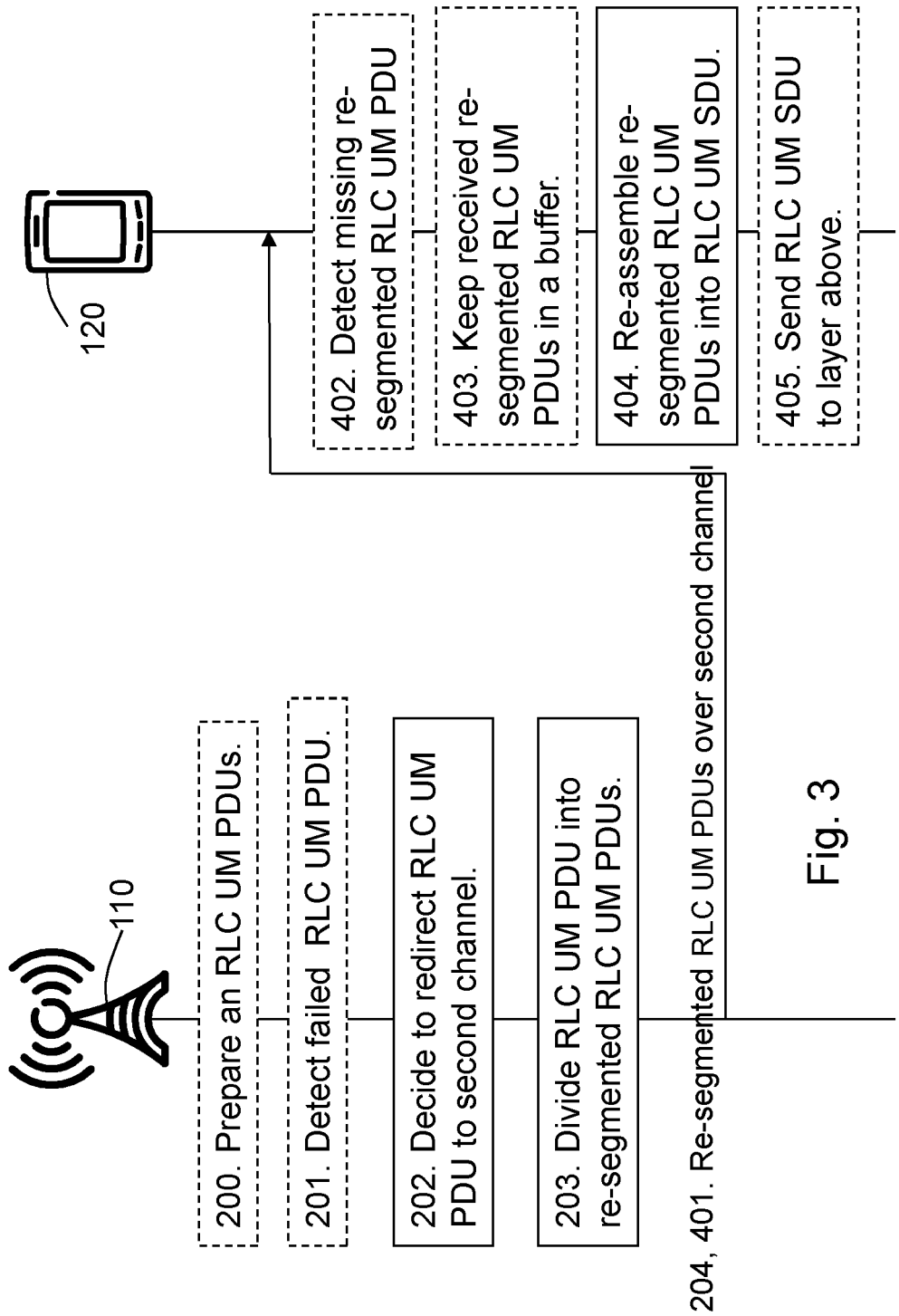
FIG. 3 is a sequence diagram illustrating embodiments of a method.

Example embodiments of a method performed by a first network node 110, for transmitting a Radio Link Control, RLC, Unacknowledged Mode, UM, Protocol Data Unit, PDU, to a second network node 120 will now be described with reference to a flowchart depicted in FIG. 2 and the sequence diagram depicted in FIG. 3. As mentioned the first network node 110 and second network node 120 operate in a wireless communications network 100, which wireless communications network 100 provides a first channel and a second channel. The first channel may be represented by a ULC and the second channel may be represented by an LC. However, it may also be the other way around. It may also be that both first and second channels both are ULC or both are LC. Thus in some embodiments, the first channel and the second channel are the same channel. This may e.g. be applicable in an example scenario where for example first transmission fails due to decoding failure wherein sender wish to lower the likeliness for decoding failure by sending the PDU contents using two or more transmissions, each transmission contains a piece of original PDU contents.

The method comprises the following actions, which actions may be taken in any suitable order. Dashed lines of some boxes in FIGS. 2 and 3 indicate that this action is not mandatory.

Action 200

In an example scenario, the first network node 110 prepares an RLC UM PDUs to be transmitted over the first channel which in this example is an ULC. A number of RLC UM PDUs may be prepared.

Some embodiments are applied on LAA-LTE where access to the ULC for example the un-licensed channel, i.e. the wireless media over which communication occurs, is controlled by the LBT mechanism. In such scenario, RLC in the first network node 110 may need to prepare PDUs for transmissions before knowing if access to medium is granted. Hence, Layer 2 prepares and provides RLC UM PDUs to a transmit buffer in the first network node 110, for a specific transmission time instance. Layer 2 is typically referred to the entity responsible how communication over the media is controlled including preparing data blocks called transport blocks that are provided to Layer 1 which encode and prepare data to be sent one the physical media. If access to medium is granted for this transmission time instance by LBT then the PDU is transmitted from the first network node to the second network node 120 over the first channel which in the example scenario is the ULC. Otherwise the RLC UM PDU is not sent and Layer 2 needs to make another attempt at a later transmission time instance.

One further RLC UM PDUs may be prepared for the first channel and sent to the transmit buffer in the first network node 110. This particular embodiment relates specific to a particular timing for LAA-LTE. For LAA-LTE the timing is such that Layer 2 in this particular embodiment needs to prepare two RLC UM PDUs for two transmission time instances until Layer 2 gets an indication if access to medium was granted or not. Hence in this particular embodiment, Layer 2 prepares PDUs for transmission two transmission time intervals in advance.

The first network node 110 waits for success signal from the transmitter. A success indicator is always received 2 transmission time intervals after Layer 2 preparation. The success signal is received once per Transmission Time Interval (TTI) if there are PDUs in the transmit buffer.

Action 201

The first network node 110 detects that the RLC UM PDU has failed to be transmitted over the first channel. In the example scenario the ULC represents the first channel. This may e.g. be detected if e.g. access to media cannot be achieved within a predetermined number of attempts such as Tmax attempts. Tmax is the number of TTIs to wait before PDUs are redirected to the second channel such as e.g. to LC. Access to media refers to if the listen-before-talk mechanism did not grant access to the communication medium such as the first channel.

In other embodiments unsuccessful HARQ retransmissions which e.g. may be controlled by using a timeout timer may be used to detect that the RLC UM PDU has failed to be correctly received over the first channel, i.e. the ULC in the example scenario.

Action 202

In some embodiments a redirection which will be triggered, when detected that the RLC UM PDU has failed to be transmitted over the first channel e.g. if access to media cannot be achieved within Tmax attempts or if unsuccessful HARQ retransmissions is detected.

Thus, according to embodiments herein, when detected that the RLC UM PDU has failed to be transmitted over the first channel, the first network node 110 decides to redirect the RLC UM PDU to be transmitted over the second channel. In the example scenario a decision is made to redirect the RLC UM PDU from the ULC to the LC.

Action 203

The RLC UM PDU is too large to be sent in a single transmission over the second channel. Therefore, the first network node 110 divides the RLC UM PDU into two or more re-segmented RLC UM PDUs. In some embodiments the data part of the RLC UM PDU is re-assembled to an ordered sequence of Service Data Unit (SDU) segments then the re-segmented RLC UM PDUs are created using ordinary segmentation procedure with the difference that the re-segmented RLC UM PDUs have the same SN as original RLC UM PDU and that SI indicates re-segmented RLC UM PDUs, re-segmented RLC UM PDUs comprises a Segment Sequence Number (SSN) indicating order of re-segmented RLC UM PDUs and that the last re-segmented RLC UM PDU comprises an indicator, indicating that it is the last re-segmented RLC UM PDU. In other embodiments the data part and sub-header part, e.g. Octet 3 to end of PDU, of the original RLC UM PDU is partitioned into smaller pieces and the pieces ordered such that if the pieces are put together in said order then the pieces together coincide with the data and sub-header parts of the original RLC UM PDU.

Please note that the parts of a re-segmented RLC UM PDU may be referred to as re-segments since the parts may not be divided precisely at the segment borders of the original RLC UM PDU. Thus segments of a re-segmented RLC UM PDU do not necessarily coincide with segments of the original RLC UM PDU.

Action 204

The first network node 110 transmits the two or more re-segmented RLC UM PDUs to the second network node 120 over the second channel.

Each re-segmented RLC UM PDU comprises the following indications:
(a) that the PDU is re-segmented,
(b) an order indicator related to the re-segmented RLC UM PDU, and
(c) whether or not the re-segmented RLC UM PDU is a last re-segmented RLC UM PDU out of the two or more re-segmented RLC UM PDUs.

The indications may be comprised in a header of the re-segmented RLC UM PDU. In order to achieve transmission of already created RLC UM PDUs e.g. on a channel with lower capacity than it was produced for, the UM PDU header is modified according to some embodiments herein.

In some particular embodiments, the indication (a) that the PDU is re-segmented is indicated e.g. by means of a Segmentation Indicator (SI) in a first octet of the header, for example in the third bit of the first octet of the header. Further, the indications (b) an order indicator related to the re-segmented RLC UM PDU, and (c) whether or not the re-segmented RLC UM PDU is a last re-segmented RLC UM PDU out of the two or more re-segmented RLC UM PDUs, are indicated e.g. by means of a Last Segment (LS) bit in a third octet of the header. However, the indications may be contained in any suitable bit or octet of the header.

The order indicator related to the re-segmented RLC UM PDU may be represented by a SSN which may be comprised in the third octet of the re-segmented RLC UM PDU.

In an example scenario, one of the reserved bits is used as an SI. If the SI bit is set to 1, a LS bit and an SSN is added as octet 3 in the header.

Thus the segments of the original RLC UM PDU may be re-segmented into two or more re-segmented RLC UM PDUs that can be sent one by one using the SSN as an indication of the order of the segments in the re-segmented RLC UM PDUs. The LS bit is set to 1 in the last re-segmented RLC UM PDU.

Figure 4:
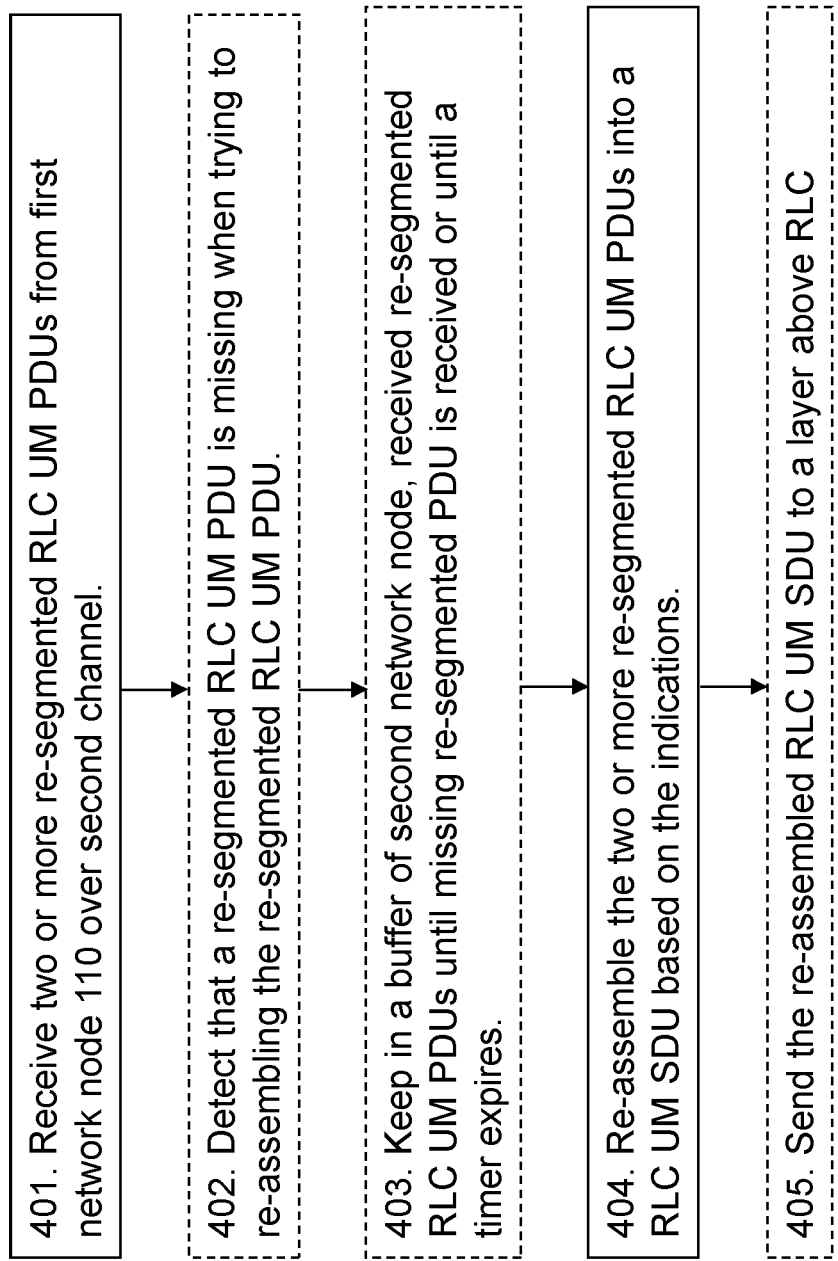
FIG. 4 is a flowchart depicting embodiments of a method in a second network node.

Example embodiments of a method performed by the second network node 120, for receiving two or more re-segmented RLC, Unacknowledged Mode, UM, Protocol Data Unit, PDUs from a first network node 110, will now be described with reference to a flowchart depicted in FIG. 4 and the sequence diagram depicted in FIG. 3. As mentioned above, the second network node 120 and the first network node 110 operate in a wireless communications network 100. The wireless communications network 100 provides a first channel and a second channel.

The first channel may be represented by a ULC and the second channel may be represented by an LC. However, it may also be the other way around or both may be ULC or both may be LC. In some embodiments, the first channel and the second channel are the same channel.

In an example scenario, the first network node 110 prepared an RLC UM PDU to be transmitted over the first channel which in this example is an ULC. However, the transmission failed and the first network node 110 has redirected the RLC UM PDU to be transmitted over the second channel. In this example scenario, the first channel is represented by a ULC and the second channel is represented by an LC.

The method comprises the following actions, which actions may be taken in any suitable order.

Action 401

The second network node 120 receives two or more re-segmented RLC UM PDUs from the first network node 110 over the second channel. Each re-segmented RLC UM PDU comprises the following indications:

(a) that the PDU is re-segmented,
(b) an order indicator related to the re-segmented RLC UM PDU, and
(c) whether or not the re-segmented RLC UM PDU is a last re-segmented RLC UM PDU out of the two or more re-segmented RLC UM PDUs.

The indications may be comprised in a header of the re-segmented RLC UM PDU. In some embodiments the indication (a) that the RLC UM PDU is re-segmented is indicated in a first octet of the header. Further, the indications (b) an order indicator related to the re-segmented RLC UM PDU, and (c) whether or not the re-segmented RLC UM PDU is a last re-segmented RLC UM PDU out of the two or more re-segmented RLC UM PDUs, may be indicated in a third octet of the header.

The order indicator related to the re-segmented RLC UM PDU may be represented by a Segment Sequence Number (SSN).

Please see further explanations to this action under Action 204 above.

Action 402

The second network node 120 may detect that a re-segmented RLC UM PDU is missing when trying to re-assembling the RLC UM PDU. Action 402 and 403 will be more explained below.

Action 403

When detecting that a re-segmented RLC UM PDU is missing, the second network node 120 keeps in a buffer of the second network node 120, the received re-segmented RLC UM PDUs until the missing re-segmented RLC UM PDU has been received or until a timer expires, before re-assembling in Action 404 below, the re-segmented RLC UM PDUs into one or more RLC UM SDU segments comprised in the two or more re-segmented RLC UM PDUs and sending in Action 405 below, the re-assembled RLC UM SDU segments in order to a layer above RLC. The SDUs extracted from the RLC UM PDUs are sent to a layer above RLC.

Action 404

The second network node 120 re-assembles the two or more re-segmented RLC UM PDUs into a RLC UM PDU based on the indications. This may be performed such that when the second network node 120 has received all re-segmented RLC UM PDUs the order indicator indicates the order in which the re-segments shall be put together. In some embodiments the LI_n are indicators, See FIG. 9 which will be described below.

Action 405

The second network node 120 may send the re-assembled RLC UM SDU segments in order to a layer above RLC. In LTE use-plane protocol stack the layer above RLC is PDCP. On sender side, a RLC UM PDU comprises one or more RLC SDU segments. For example, an RLC SDU is a PDCP PDU and a RLC SDU segment is either a whole or fractional part of a PDCP PDU. When the second node 120 has re-assembled a RLC UM PDU, which may be a re-segmented RLC UM PDU, it delivers whole RLC SDUs, i.e., PDCP PDUs, to higher layer such as PDCP receiving instance.

Embodiments herein will now be described and explained more in detail. The text below is applicable to and may be combined with any suitable embodiment described above.

According to embodiments herein, the RLC UM PDU header is modified to allow for RLC UM PDU re-segmentation. To explain the modification the modified header, it will be compared to a prior art header according to the discussion below. FIGS. 5 and 6 depicts the difference between original and modified RLC UM PDU headers according to an example.

A prior art RLC UM PDU comprises one or more RLC Service Data Unit (SDU) segments where all except first and/or last segments are whole SDUs. An RLC SDU is a packet or PDU related to a layer above the RLC layer in the LTE protocol stack. If the first segment for the RLC UM PDU with SN=N is a segmented SDU, then the prior SDU segment part is comprised in the last segment in the RLC UM PDU with SN=N−1. If last segment is a segmented SDU, then the first segment of the RLC UM PDU with SN=N+1 is the sequential part of the segmented SDU. Hence, a segmented RLC SDU is always contained in two or more consecutive (in SN) RLC PDUs. This means that the SN maps to specific RLC SDUs that cannot be changed once RLC UM PDUs with higher SN has been sent. The header of a prior art RLC UM PDU is shown in FIG. 5.

The first network node 110 such as an eNB implementing embodiments herein, behave not different from a state-of-the-art eNB for original transmissions of the RLC UM PDUs. The difference is that the prior art eNB cannot re-segment the RLC UM PDUs. When the first network node 110 e.g. an eNB implements embodiments herein, e.g. the third bit in the first octet of the header is no longer reserved, the modified header now indicates if the RLC UM PDUs are re-segmented or not. Non-re-segmented RLC UM PDUs has same structure as prior art PDUs except for the meaning of the third bit. The second network node 120 such as a user equipment 120 implementing embodiments herein also performs prior art tasks. If the first network node 110 however decides to re-segment an RLC UM PDU, which a prior art eNB or user equipment cannot do, the first network node 110 sets the third bit of the first octet of the header to 1 and adds a third octet comprising a last segment indicator such as an LS and a segment sequence number. This third octet is preferable only present if SI=1, i.e. for re-segmented RLC UM PDUs. An example of a modified header of a RLC UM PDU according to embodiments herein is shown in FIG. 6.

This means that the header is modified in that third bit indicates to the second network node 120 if the RLC UM PDU is a re-segmented RLC UM PDU or not. If third bit is not set to 1 the second network node 120 performs same tasks as in prior art. But if the third bit is set to 1 then the second network node 120 treat the RLC UM PDU as a re-segmented RLC UM PDU and reads LS and SSN in order to be able to correctly re-assemble the RLC SDU segments from the received re-segmented RLC UM PDUs.

Please note that both SI and LS may be present in the first octet in some embodiments, i.e. using two of the reserved bits. In such embodiments, the SSN may cover a whole octet.

Figure 7:
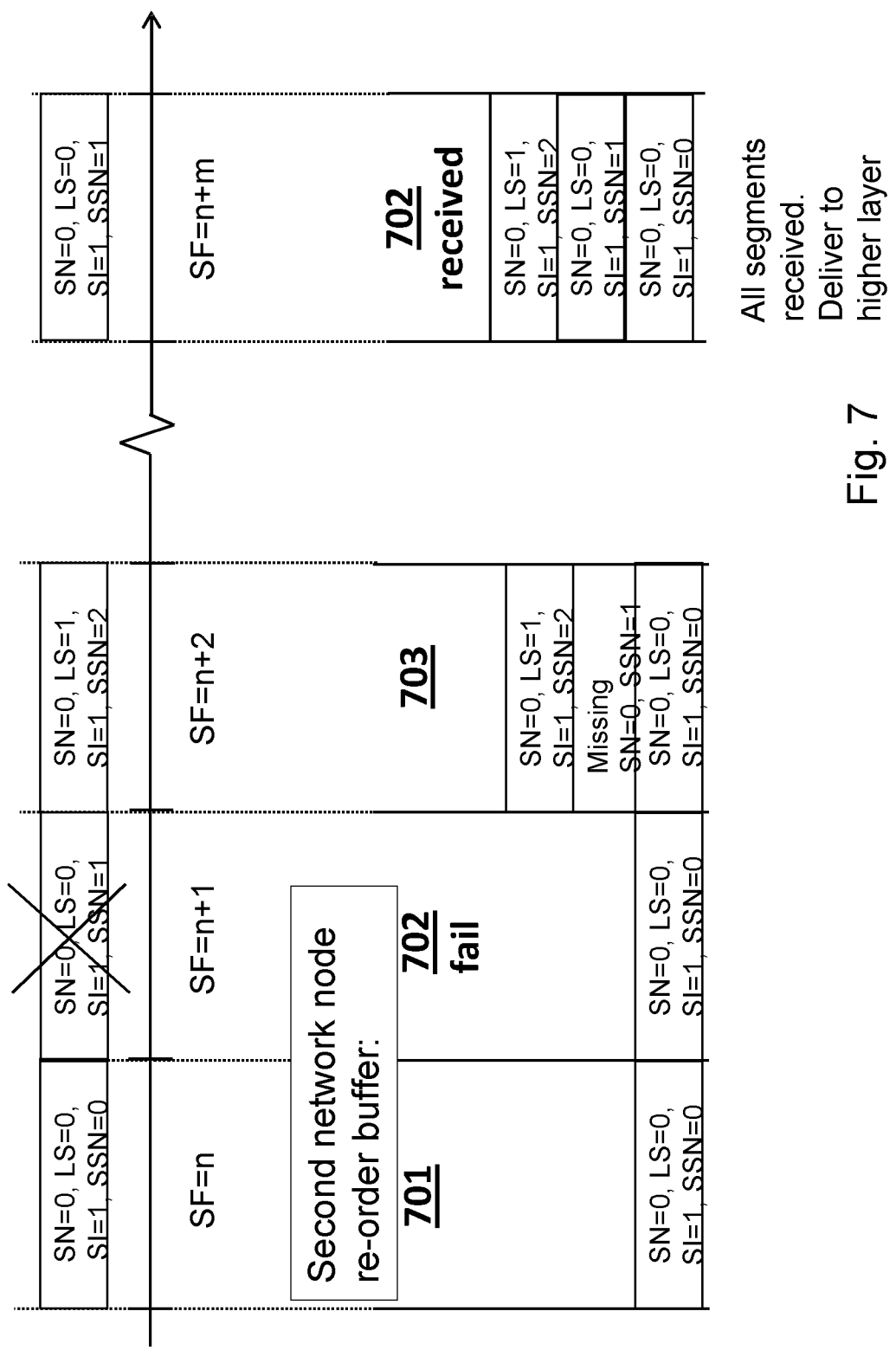
FIG. 7 is a schematic diagram illustrating embodiments herein.

Relating to Action 402 and 203 above, in beneficial embodiment the first network node 110 make one or more transmission attempts on the first channel such as an ULC for a number of RLC UM PDUs. Some of these arrive at the second network node 120 while other RLC UM PDUs could not be sent due to LBT was not permitting access to medium. The first network node 110 may try to re-send those for a number of attempts, but at some point the first network node 110 decides to re-send on a second channel such as an LC, which the first network node 110 knows that it can send on. However, the RLC UM PDU is too large to be sent in a single transmission over the second channel. This may e.g. be since the second channel has smaller bandwidth than the first channel and the RLC UM PDU to be resent is too large to occur in a single transmission. FIG. 7 shows such a scenario where RLC UM PDU with SN=0 was first attempted to be sent on ULC, which happened before SF=n, i.e. not shown in FIG. 7, but now is re-segmented. The first re-segmented RLC UM PDU 701 is sent in SF=n over the second channel here being an LC and is received by the second network node 110. In this example, it cannot be delivered to higher layer since all segments not received. (SI=1 and LS=0).

FIG. 7 shows that the second re-segmented RLC UM PDU 702 fails, also on the second channel. In this scenario, it cannot be delivered to higher layer since all segments not received. (SI=1 and LS=0).

The second network node receives the first re-segmented RLC UM PDU 701 and the third re-segmented RLC UM PDU 703 in SF=n and SF=n+2 while the second re-segmented RLC UM PDU 702 arrives at UE in SF=n+m.

The top-most part of the diagram, indicate what is transmitted. The cross indicates that decoding failed. The lower part of the diagram illustrates schematically the RLC re-order buffer in second node 120. The bottom-most layer indicates the first entry in the second network node's RLC re-order buffer.

In other embodiments the first network node 110 make first attempts of sending RLC UM PDU over the first channel which some may succeed to arrive at the second network node 120 while other may not successfully arrive to the second network node 120. The first network node 110 may get an indication that first channel is heavily loaded and may therefore decide to re-send the failed PDUs on the second channel which e.g. is lower loaded. If second channel has lower bandwidth or the radio conditions on that carrier is worse than first network node 110 need to re-segment the PDUs.

For example, at SF=n−1 an indication from Layer 1 is received that RLC UM PDU with SN=0 could not be sent over the first channel being a ULC. The RLC UM PDU is then re-segmented into 3 re-segmented RLC UM PDUs of which the first re-segmented RLC UM PDU, SSN=0, is transmitted over the second channel being an LC at SF=n. The next re-segmented RLC UM PDU is transmitted at SF=n+1, and the last re-segmented RLC UM PDU, LS=1, at SF=n+2.

If the transmission of segment SSN=1 fails, a hole will appear in the re-order buffer of the second network node 120. The hole may eventually be filled due to HARQ retransmission and then the original PDU is reassembled and its contents delivered to higher layers, i.e. a layer above the layer associated with RLC. If the hole is not filled, the entire original RLC UM PDU may be discarded.

In other embodiments wherein the data part is re-assembled to an ordered sequence of SDU segments then the re-segmented RLC UM PDUs are created using ordinary segmentation procedure with the difference that the re-segmented RLC UM PDUs have the same SN as original PDU and that SI indicates re-segmented RLC UM PDUs, re-segmented RLC UM PDUs comprises an SSN indicating order of re-segmented RLC UM PDUs and that the last re-segmented RLC UM PDU comprises an indicator that it is the last re-segmented RLC UM PDU. In such embodiments, some of RLC SDUs contained in the original RLC UM PDU can be delivered to higher layer even if some of the re-segmented RLC UM PDUs are lost. In such embodiments, each re-segmented RLC UM PDU comprises information on how to re-assemble RLC SDU segments and it also means that when the second node has received the first re-segmented RLC UM PDU it can start re-assemble the SDU segments and deliver complete SDUs to higher layers. Hence, the second network node 120 does not need to wait until all re-segmented SDUs have been received.

Thus in some embodiments the second network node 120 re-assembles a data part of the re-segmented RLC UM PDU to an ordered sequence of SDU segments, wherein each re-segmented RLC UM PDU comprises information on how to re-assemble into RLC SDU segments and when the second node 120 has received the first re-segmented RLC UM PDU starting to re-assemble the SDU segments and deliver complete SDUs in order to layer above RLC before all re-segmented SDUs has been received.

In some embodiments the SDU segments sent in re-segmented RLC UM PDUs may not all be complete. The non-complete ones need to be re-assembled to complete SDUs using non-re-segmented RLC UM PDUs.

In some embodiments the RLC UM SDU segments in a non-re-segmented RLC UM PDU, in these embodiments, a re-segmented RLC UM PDU may be re-assembled to a complete SDU.

In some embodiments, the second network node 120 may operate such that it receives two or more re-segmented RLC UM PDUs. Then it re-orders and re-assembles the re-segmented RLC UM PDUs to ordered SDU segments. Once, that has been done, the second node may (re-)create the un-re-segmented RLC UM PDU that first node actually re-segmented. The created un-re-segmented RLC UM PDU may then be fed to state-of-the-art re-order, re-assemble and deliver-to-higher-layer method.

Figure 8:
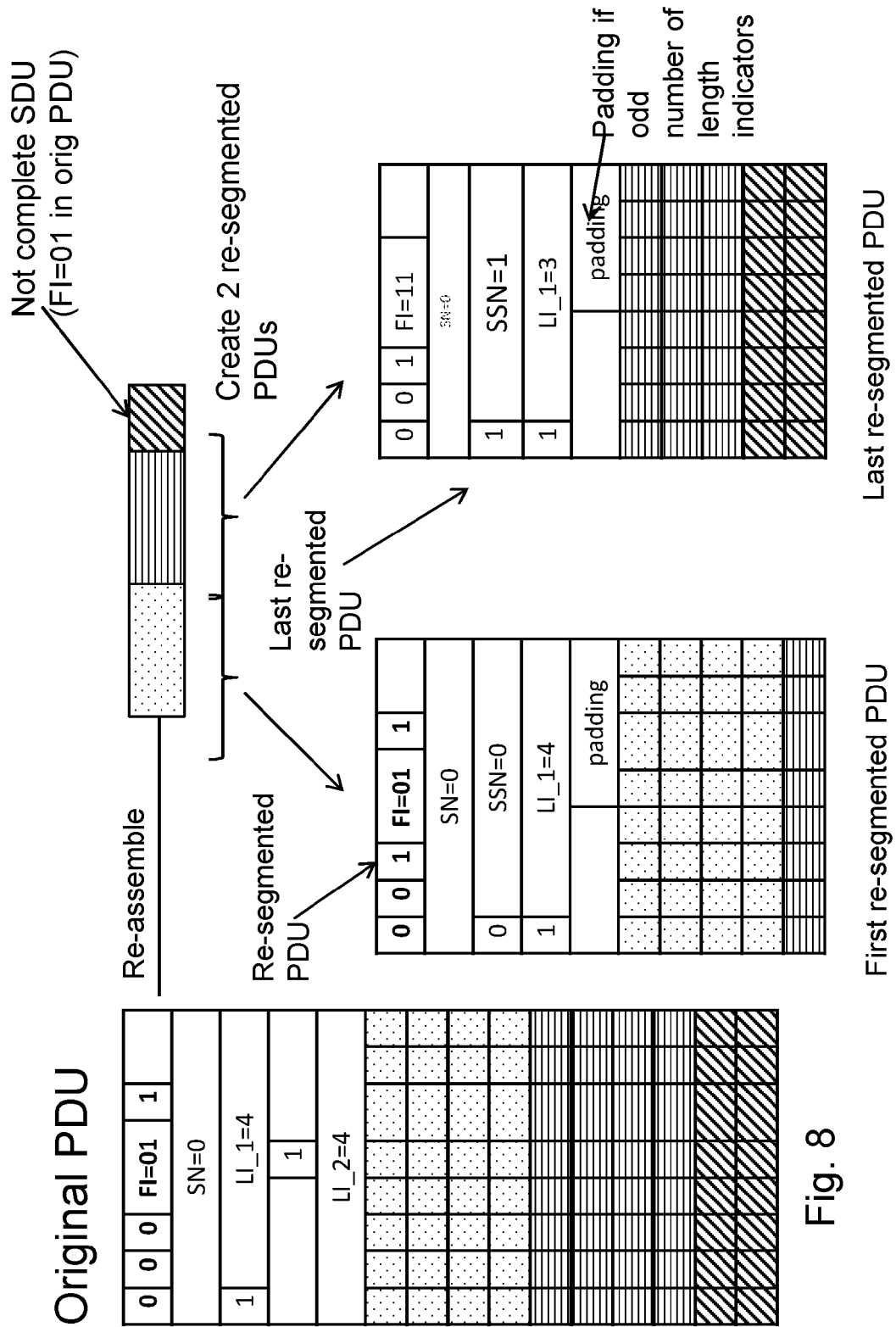
FIG. 8 is a schematic block diagram illustrating embodiments of a first network node.

Relating to Action 203 above, FIG. 8 illustrates an example of the PDU re-segmentation in the first network node 110.

Figure 9:
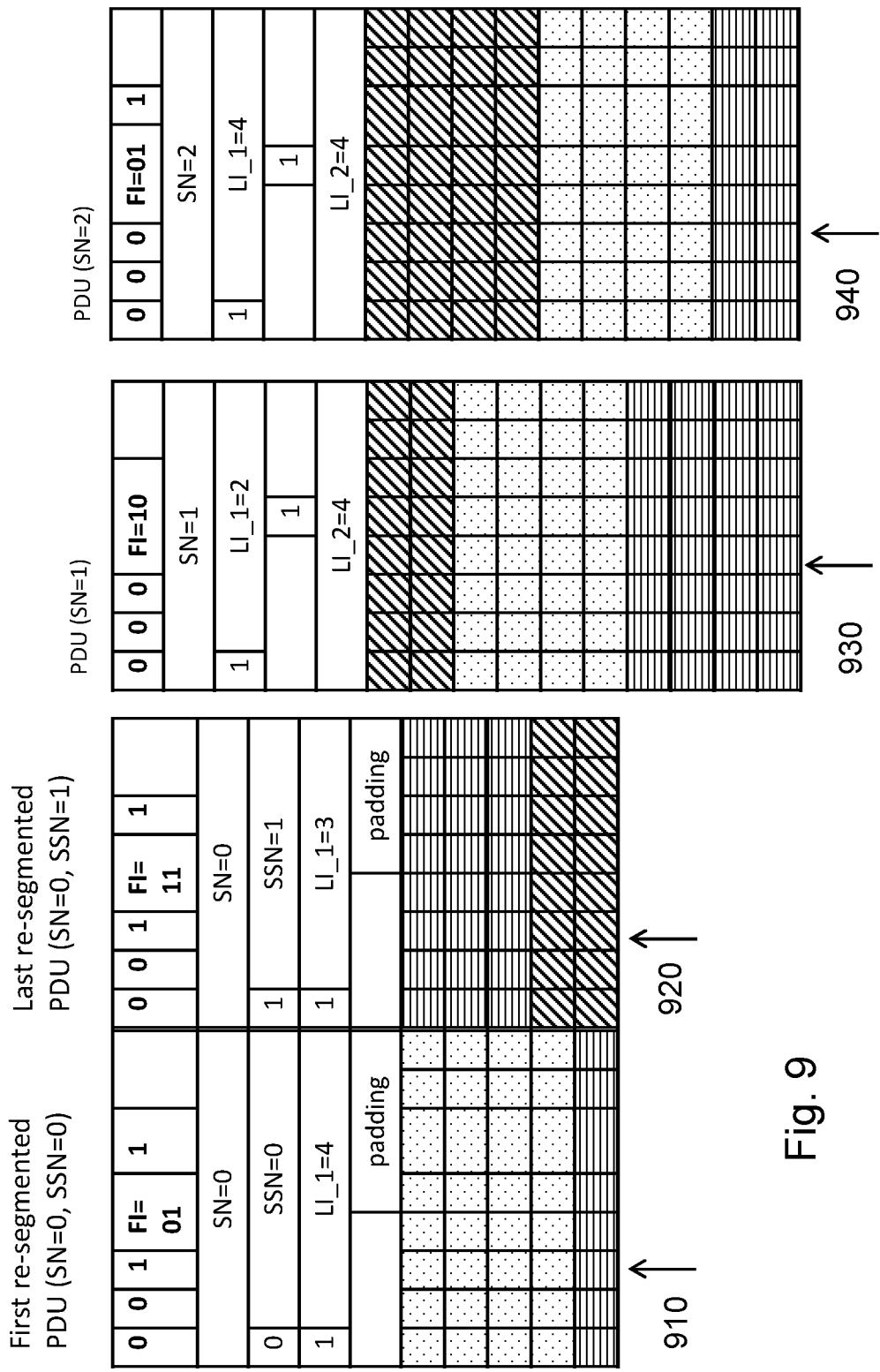
FIG. 9 is a schematic block diagram illustrating embodiments of a second network node.

Relating to Action 404 above, FIG. 9 illustrates an example of the re-assembling of the in FIG. 8 re-segmented RLC UM PDUs in the second network node 120.

Relating to re-segmented RLC UM PDU 910, FI=01 indicates that last segment of this PDU shall be re-assembled with first segment of next PDU. FI=01 also indicates that first segment is a complete SDU.

Relating to re-segmented RLC UM PDU 920, FI=11 indicates that first segment of this PDU shall be re-assembled with last segment of previous PDU, and that last segment of this PDU shall be re-assembled with first segment of next PDU.

Relating to re-segmented RLC UM PDU 930, FI=10 indicates that first segment of this PDU shall be re-assembled with last segment of previous PDU, and also that two following segments are complete.

Relating to re-segmented RLC UM PDU 940, FI=01 indicates that last segment of this PDU shall be re-assembled with first segment of next PDU, and also indicating that the first two segments are complete.

Figure 10:
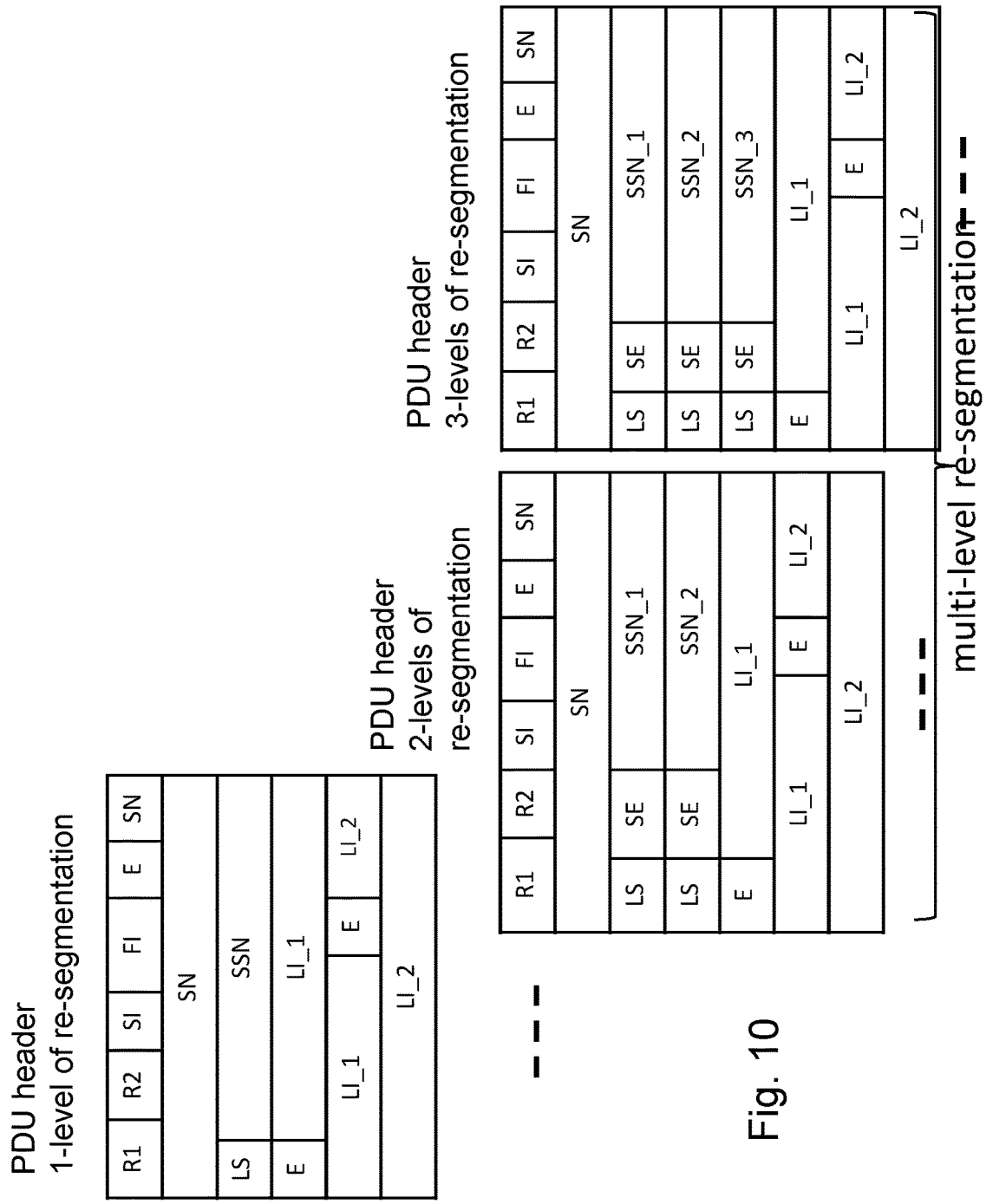
FIG. 10 is a schematic block diagram illustrating different levels of re-segmentation in a Packet Data Unit (PDU) header.

In FIG. 10 an example of a PDU header 1-level of re-segmentation, a PDU header 2-level of re-segmentation and a PDU header 3-level of re-segmentation is illustrated. According to some embodiments, to support multi-level re-segmentation 1-bit SE is needed to indicate "a next level" and therefore in this embodiment, SSN will be one bit less.

SE Field Interpretation:

The value 0 indicates: A set of LS, SE, SSN fields are not following the last bit of the SSN following this bit.

The value 1 indicates: A set of LS, SE, SSN fields are following the last bit of the SSN following this bit.

Figure 11:
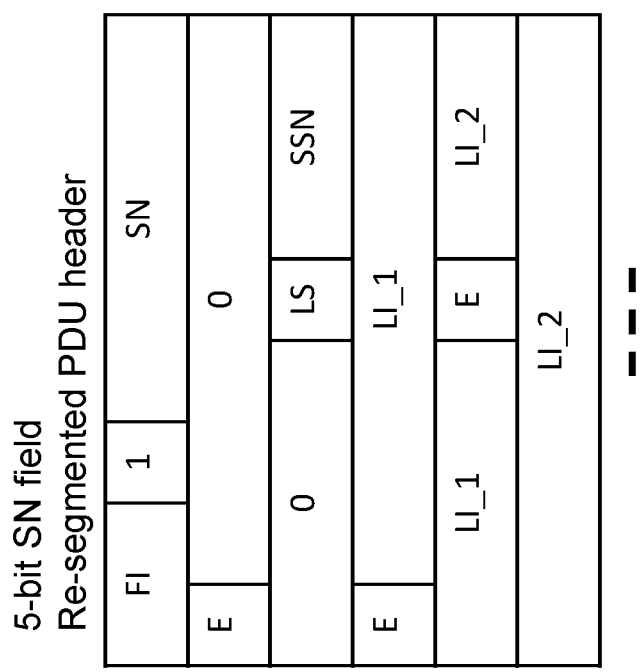
FIG. 11 is a schematic block diagram illustrating indication of a re-segmented RLC UM PDU header.

In a further embodiment depicted in FIG. 11, to indicate re-segmented RLC UM PDU, the E bit in first octet is set to 1 to indicate an E and LI fields following the last bit of SN. In state-of-the-art, LI=0 is reserved, but in embodiments herein the value 0 indicates re-segmented RLC UM PDU and presence of LS and SSN field. The E bit in second octet indicates if 4-th octet is data or an E and LI fields Referring to 3GPP TS 36.322 Section 6.2.2. In 6.2.2.4 the Extension bit (E) field comprises:

Length: 1 bit.

The E field indicates whether Data field follows or a set of E field and LI field follows. The interpretation of the E field is provided in Table 6.2.2.4-1 and Table 6.2.2.4-2 below.

TABLE 6.2.2.4-1

E field interpretation (for E field in the fixed part of the header)

| Value | Description |
|---|---|
| 0 | Data field follows from the octet following the fixed part of the header |
| 1 | A set of E field and LI field follows from the octet following the fixed part of the header |

TABLE 6.2.2.4-2

E field interpretation (for E field in the extension part of the header)

| Value | Description |
|---|---|
| 0 | Data field follows from the octet following the LI field following this E field |
| 1 | A set of E field and LI field follows from the bit following the LI field following this E field |

Please note that in state-of-the-art the fixed part of the header is 2 octets. In embodiments herein (SI=1) the fixed part of the header may be 3 octets.

Referring Again to 3GPP TS 36.322 Section 6.2.2.

In 6.2.2.5 Length Indicator (LI) field comprises:

Length: 11 bits.

The LI field indicates the length in bytes of the corresponding Data field element present in the RLC data PDU delivered/received by an UM or an AM RLC entity. The first LI present in the RLC data PDU header corresponds to the first Data field element present in the Data field of the RLC data PDU, the second LI present in the RLC data PDU header corresponds to the second Data field element present in the Data field of the RLC data PDU, and so on. The value 0 is reserved.

In 6.2.2.6 Framing Info (FI) field comprises:

Length: 2 bits.

The FI field indicates whether a RLC SDU is segmented at the beginning and/or at the end of the Data field. Specifically, the FI field indicates whether the first byte of the Data field corresponds to the first byte of a RLC SDU, and whether the last byte of the Data field corresponds to the last byte of a RLC SDU.

The interpretation of the FI field is provided in Table 6.2.2.6-1.

TABLE 6.2.2.6-1

FI field interpretation

| Value | Description |
|---|---|
| 00 | First byte of the Data field corresponds to the first byte of a RLC SDU. Last byte of the Data field corresponds to the last byte of a RLC SDU. |

TABLE 6.2.2.6-1-continued

FI field interpretation

| Value | Description |
|---|---|
| 01 | First byte of the Data field corresponds to the first byte of a RLC SDU.<br>Last byte of the Data field does not correspond to the last byte of a RLC SDU. |
| 10 | First byte of the Data field does not correspond to the first byte of a RLC SDU.<br>Last byte of the Data field corresponds to the last byte of a RLC SDU. |
| 11 | First byte of the Data field does not correspond to the first byte of a RLC SDU.<br>Last byte of the Data field does not correspond to the last byte of a RLC SDU. |

Figure 12:
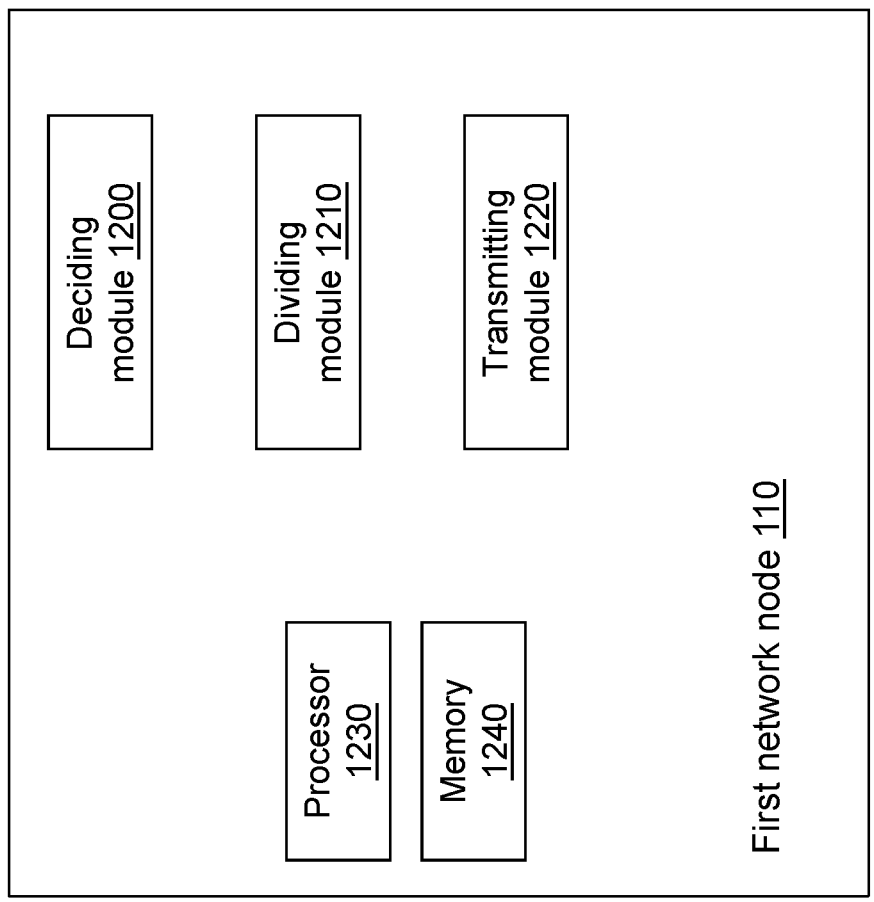
FIG. 12 is a schematic block diagram illustrating an exemplary arrangement of one or more functional units/components of a first network node.

To perform the method actions for transmitting a RLC UM PDU to the second network node 120 described above in relation to FIGS. 2 and 3, the first network node 110 may comprise the following arrangement depicted in FIG. 12. The first network node 110 and second network node 120 are adapted to operate in a wireless communications network 100. The wireless communications network 100 is configured to provide a first channel and a second channel 16. The first channel may be arranged to be represented by a ULC and the second channel may be arranged to be represented by an LC.

In some embodiments, the first channel and the second channel are arranged to be the same channel.

The first network node 110 is configured to, e.g. by means of a deciding module 1200 configured to, when detected that the RLC UM PDU has failed to be transmitted over the first channel, decide to redirect the RLC UM PDU to be transmitted over the second channel. The RLC UM PDU is too large to be sent in a single transmission over the second channel.

The first network node 110 is further configured to, e.g. by means of a dividing module 1210 configured to, divide the RLC UM PDU into two or more re-segmented RLC UM PDUs.

The first network node 110 is further configured to, e.g. by means of a transmitting module 1220 configured to, transmit the two or more re-segmented RLC UM PDUs to the second network node 120 over the second channel. The transmitting module 820 may be comprised in a wireless transmitter of the first network node 110. Each re-segmented RLC UM PDU is arranged to comprise the following indications:
  (a) that the PDU is re-segmented,
  (b) an order indicator related to the re-segmented RLC UM PDU, and
  (c) whether or not the re-segmented RLC UM PDU is a last re-segmented RLC UM PDU out of the two or more re-segmented RLC UM PDUs.

The indications may be arranged to be comprised in a header of the re-segmented RLC UM PDU.

The indication (a) that the PDU is re-segmented is adapted to be indicated in a first octet of the header. Further the indications (b) an order indicator related to the re-segmented RLC UM PDU, and (c) whether or not the re-segmented RLC UM PDU is a last re-segmented RLC UM PDU out of the two or more re-segmented RLC UM PDUs, are adapted to be indicated in a third octet of the header.

In some embodiments, the order indicator related to the re-segmented RLC UM PDU is arranged to be represented by a segment sequence number.

The embodiments herein comprising the process of transmitting a RLC UM PDU to a second network node 120 may be implemented through one or more processors, such as a processor 1230 in the first network node 110 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the first network node 110. One such carrier may be in the form of a CD ROM disc. It is however feasible with other data carriers such as a memory stick. The computer program code may furthermore be provided as pure program code on a server and downloaded to the first network node 110.

The first network node 110 may further comprise a memory 1240 comprising one or more memory units. The memory 1240 comprises instructions executable by the processor 1230. The memory 1240 is arranged to be used to store e.g. RLC UM PDUs, re-segmented RLC UM PDUs, order indicators related to re-segmented RLC UM PDUs, data, configurations, and applications etc. to perform the methods herein when being executed in the first network node 110.

Those skilled in the art will also appreciate that the an detecting module 1200, dividing module 1210, and transmitting module 1220, described above may refer to a combination of analog and digital circuits, and/or one or more processors configured with software and/or firmware, e.g. stored in the memory 1240, that when executed by the one or more processors such as the processor 1230 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 13:
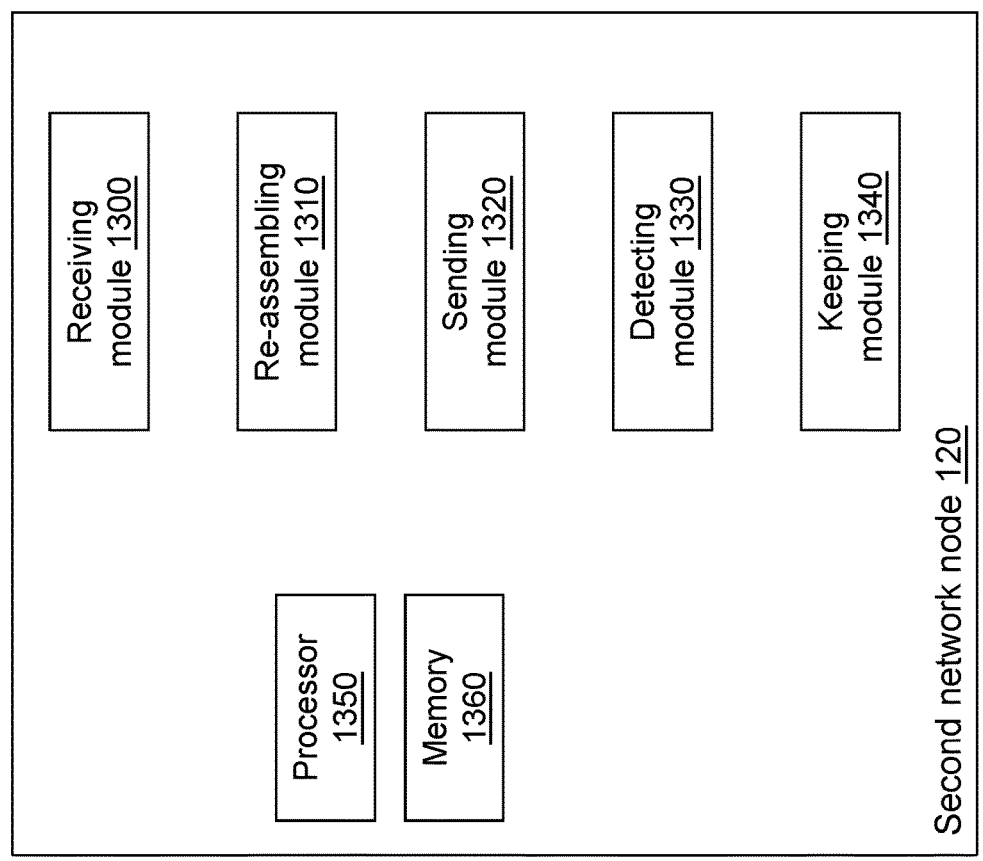
FIG. 13 is a schematic block diagram illustrating an exemplary arrangement of one or more functional units/components of a second network node.

To perform the method actions for receiving two or more re-segmented RLC UM PDUs from the first network node 110 described above in relation to FIGS. 3 and 4, the second network node 120 may comprise the following arrangement depicted in FIG. 13. As mentioned above second network node 120 and first network node 110 are adapted to operate in a wireless communications network 100. The wireless communications network 100 is configured to provide a first channel and a second channel. The first channel may be arranged to be represented by a ULC, and the second channel may be arranged to be represented by an LC. In some embodiments, the first channel and the second channel are arranged to be the same channel.

The second network node 120 being configured to, e.g. by means of a receiving module 1300 configured to, receive two or more re-segmented RLC UM PDUs from the first network node 110 over the second channel. Each re-segmented RLC UM PDU is arranged to comprise the following indications:
  (a) that the PDU is re-segmented,
  (b) an order indicator related to the re-segmented RLC UM PDU, and
  (c) whether or not the re-segmented RLC UM PDU is a last re-segmented RLC UM PDU out of the two or more re-segmented RLC UM PDUs.

The receiving module 900 may be comprised in a wireless transceiver of the second network node 120.

In some embodiments the order indicator related to the re-segmented RLC UM PDU is arranged to be represented by a segment sequence number.

The indications may be arranged to be comprised in a header of the re-segmented RLC UM PDU. The indication (a) that the PDU is re-segmented may be arranged to be indicated in a first octet of the header. Further, the indications (b) an order indicator related to the re-segmented RLC UM PDU, and (c) whether or not the re-segmented RLC UM PDU is a last re-segmented RLC UM PDU out of the two or more re-segmented RLC UM PDUs, may be arranged to be indicated in a third octet of the header.

The second network node 120 is further configured to, e.g. by means of a re-assembling module 1310 configured to, re-assemble the two or more re-segmented RLC UM PDUs into a RLC UM PDU based on the indications.

In some embodiments, the second network node 120 according to any of the claims 22-29, wherein the second network node 120 is configured to re-assemble the two or more re-segmented RLC UM PDUs into a RLC UM PDU based on the indications by:

re-assembling a data part of the RLC UM PDU to an ordered sequence of Service Data Unit, SDU, segments, creating the re-segmented RLC UM PDUs, wherein each re-segmented RLC UM PDU is adapted to comprise information on how to re-assemble RLC SDU segments. The second network node 120 is configured to, when the second node 120 has received the first re-segmented RLC UM PDU, start to re-assemble the SDU segments and deliver complete SDUs to higher layers before all re-segmented SDUs has been received.

Thus in some embodiments the second network node 120 is configured to re-assembles a data part of the re-segmented RLC UM PDU to an ordered sequence of SDU segments, wherein each re-segmented RLC UM PDU comprises information on how to re-assemble into RLC SDU segments and when the second node 120 has received the first re-segmented RLC UM PDU starting to re-assemble the SDU segments and deliver complete SDUs in order to layer above RLC before all re-segmented SDUs has been received.

The second network node 120 may further be configured to, e.g. by means of a sending module 1320 configured to, send the re-assembled RLC UM SDU segments in order to a layer above RLC.

The second network node 120 may further be configured to, e.g. by means of a detecting module 1330 configured to, detect that a re-segmented RLC UM PDU is missing when trying to re-assembling the PDU.

The second network node 120 may further be configured to, e.g. by means of a keeping module 1340 configured to, keep in a buffer of the second network node (120), the received re-segmented RLC UM PDUs until the missing re-segmented RLC UM PDU has been received or until a timer expires, before the re-segmented RLC UM PDUs into one or more RLC UM SDU segments comprised in the two or more re-segmented RLC UM PDUs and sending the re-assembled RLC UM SDU segments in order to a layer above RLC.

The embodiments herein comprising the process of receiving a RLC UM PDU from the first network node 110 may be implemented through one or more processors, such as a processor 1350 in the second network node 120 depicted in FIG. 13, together with computer program code for performing the functions and actions of the embodiments herein. The program code mentioned above may also be provided as a computer program product, for instance in the form of a data carrier carrying computer program code for performing the embodiments herein when being loaded into the second network node 120. One such carrier may be in the form of a CD ROM disc. It is however feasible with other data carriers such as a memory stick. The computer program code may furthermore be provided as pure program code on a server and downloaded to the second network node 120.

The second network node 120 may further comprise a memory 1360 comprising one or more memory units. The memory 1360 comprises instructions executable by the processor 1350.

The memory 1360 is arranged to be used to store e.g. re-segmented RLC UM PDUs, order indicators related to re-segmented RLC UM PDUs, RLC UM PDUs, data, configurations, and applications etc. to perform the methods herein when being executed in the second network node 120.

Those skilled in the art will also appreciate that the an receiving module 1300, the re-assembling module 1310, the sending module 1320, the detecting module 1330 and the keeping module 1340, described above may refer to a combination of analog and digital circuits, and/or one or more processors configured with software and/or firmware, e.g. stored in the memory 1360, that when executed by the one or more processors such as the processor 1350 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a first network node, for transmitting a Radio Link Control (RLC) Unacknowledged Mode (UM) Protocol Data Unit (PDU) to a second network node, which first network node and second network node operate in a third generation partnership project (3GPP) wireless communications network, which 3GPP wireless communications network provides a first channel and a second channel, the method comprising:

when it is detected by the first network node that the RLC UM PDU has failed to be transmitted over the first channel, wherein the first channel is represented by an unlicensed channel (ULC), deciding to redirect the RLC UM PDU to be transmitted over the second channel, and when RLC UM PDU is too large to be sent in a single transmission over the second channel, wherein the second channel is represented by a Licensed channel (LC), dividing the RLC UM PDU into two or more re-segmented RLC UM PDUs; and transmitting the two or more re-segmented RLC UM PDUs to the second network node over the second channel, wherein each re-segmented RLC UM PDU comprises the following indications:

that the PDU is re-segmented;

an order indicator related to the re-segmented RLC UM PDU; and whether or not the re-segmented RLC UM PDU is a last re-segmented RLC UM PDU out of the two or more re-segmented RLC UM PDUs, wherein the indications are comprised in a header of the re-segmented RLC UM PDU.

2. The method according to claim 1, wherein the indications:
that the PDU is re-segmented is indicated in a first octet of the header;
an order indicator related to the re-segmented RLC UM PDU; and
whether or not the re-segmented RLC UM PDU is a last re-segmented RLC UM PDU out of the two or more re-segmented RLC UM PDUs, are indicated in a third octet of the header.

3. The method according to claim 1, wherein the first channel and the second channel both are ULC or both are LC.

4. The method according to claim 1, wherein the order indicator related to the re-segmented RLC UM PDU is represented by a segment sequence number.

5. A method performed by a second network node, for receiving two or more re-segmented Radio Link Control (RLC) Unacknowledged Mode (UM) Protocol Data Units (PDUs) from a first network node, which second network node and first network node operate in a third generation partnership project (3GPP) wireless communications network, which 3GPP wireless communications network provides a first channel and a second channel, the method comprising:
receiving, when the RLC UM PDU has failed to be received over the first channel, wherein the first channel is represented by an UnLicensed Channel (ULC), two or more re-segmented RLC UM PDUs from the first network node over the second channel, wherein the second channel is represented by an Licensed Channel (LC);
wherein each re-segmented RLC UM PDU comprises the following indications:
that the PDU is re-segmented;
an order indicator related to the re-segmented RLC UM PDU;
whether or not the re-segmented RLC UM PDU is a last re-segmented RLC UM PDU out of the two or more re-segmented RLC UM PDUs;
re-assembling the two or more re-segmented RLC UM PDUs into RLC UM Service Data Unit, SDU, segments based on the indications,
wherein the indications are comprised in a header of the re-segmented RLC UM PDU.

6. The method according to claim 5, further comprising:
sending the re-assembled RLC UM SDU segments in order to a layer above RLC.

7. The method according to claim 5, further comprising
detecting that a re-segmented RLC UM PDU is missing when trying to re-assembling the RLC UM PDU; and
keeping in a buffer of the second network node, the received re-segmented RLC UM PDUs until the missing re-segmented RLC UM PDU has been received or until a timer expires, before re-assembling the re-segmented RLC UM PDUs into one or more RLC UM SDU segments comprised in the two or more re-segmented RLC UM PDUs and sending the re-assembled RLC UM SDU segments in order to a layer above RLC.

8. The method according to claim 5, wherein the indications:
that the re-segmented RLC UM PDUs is re-segmented is indicated in a first octet of the header;
an order indicator related to the re-segmented RLC UM PDU; and
whether or not the re-segmented RLC UM PDU is a last re-segmented RLC UM PDU out of the two or more re-segmented RLC UM PDUs, are indicated in a third octet of the header.

9. The method according to claim 5, wherein the first channel and the second channel both are ULC or both are LC.

10. The method according to claim 5, wherein the order indicator related to the re-segmented RLC UM PDU is represented by a segment sequence number.

11. The method according to claim 5, wherein the re-assembling the two or more re-segmented RLC UM PDUs into a RLC UM PDU based on the indications comprises:
re-assembling a data part of the re-segmented RLC UM PDU to an ordered sequence of Service Data Unit (SDU) segments,
wherein each re-segmented RLC UM PDU comprises information on how to re-assemble into RLC SDU segments and when the second node has received the first re-segmented RLC UM PDU starting to re-assemble the SDU segments and deliver complete SDUs in order to layer above RLC before all re-segmented SDUs has been received.

12. A first network node for transmitting a Radio Link Control (RLC) Unacknowledged Mode (UM) Protocol Data Unit (PDU) to a second network node, which first network node and second network node are adapted to operate in a third generation partnership project (3GPP) wireless communications network, which 3GPP wireless communications network is configured to provide a first channel and a second channel, the first network node being configured to:
when it is detected by the first network node that the RLC UM PDU has failed to be transmitted over the first channel, wherein the first channel is represented by an UnLicensed Channel (ULC), decide to redirect the RLC UM PDU to be transmitted over the second channel, which RLC UM PDU is too large to be sent in a single transmission over the second channel, wherein the second channel is represented by an Licensed Channel (LC);
divide the RLC UM PDU into two or more re-segmented RLC UM PDUs;
transmit the two or more re-segmented RLC UM PDUs to the second network node over the second channel;
wherein each re-segmented RLC UM PDU is arranged to comprise the following indications:
that the PDU is re-segmented;
an order indicator related to the re-segmented RLC UM PDU; and
whether or not the re-segmented RLC UM PDU is a last re-segmented RLC UM PDU out of the two or more re-segmented RLC UM PDUs,
wherein the indications are comprised in a header of the re-segmented RLC UM PDU.

13. The first network node according to claim 12, wherein the indications:
that the re-segmented RLC UM PDU is re-segmented is adapted to be indicated in a first octet of the header;
an order indicator related to the re-segmented RLC UM PDU; and
whether or not the re-segmented RLC UM PDU is a last re-segmented RLC UM PDU out of the two or more re-segmented RLC UM PDUs, are adapted to be indicated in a third octet of the header.

14. A second network node for receiving two or more re-segmented Radio Link Control (RLC) Unacknowledged Mode (UM) Protocol Data Units (PDUs) from a first network node, which second network node and first network node are adapted to operate in a third generation partnership project (3GPP) wireless communications network, which 3GPP wireless communications network is configured to provide a first channel and a second channel, the second network node being configured to:
- receive, when the RLC UM PDU has failed to be received over the first channel, wherein the first channel is represented by an UnLicensed Channel (ULC), two or more re-segmented RLC UM PDUs from the first network node over the second channel, wherein the second channel is represented by an Licensed Channel (LC);
- wherein each re-segmented RLC UM PDU is arranged to comprise the following indications:
  - that the PDU is re-segmented;
  - an order indicator related to the re-segmented RLC UM PDU; and
  - whether or not the re-segmented RLC UM PDU is a last re-segmented RLC UM PDU out of the two or more re-segmented RLC UM PDUs, and wherein the second network node further is configured to:
- re-assemble the two or more re-segmented RLC UM PDUs into RLC UM Service Data Unit, SDU, segments based on the indications, wherein the indications are arranged to be comprised in a header of the re-segmented RLC UM PDU.

15. The second network node according to claim 14, further being configured to:
- send the re-assembled RLC UM SDU segments in order to a layer above RLC.

16. The second network node according to claim 14, further being configured to:
- detect that a re-segmented RLC UM PDU is missing when trying to re-assembling the PDU; and
- keep in a buffer of the second network node, the received re-segmented RLC UM PDUs until the missing re-segmented RLC UM PDU has been received or until a timer expires, before the re-segmented RLC UM PDUs into one or more RLC UM SDU segments comprised in the two or more re-segmented RLC UM PDUs and sending the re-assembled RLC UM SDU segments in order to a layer above RLC.

17. The second network node according to claim 14, wherein the indications that the re-segmented RLC UM PDUs is re-segmented is arranged to be indicated in a first octet of the header; and
- an order indicator related to the re-segmented RLC UM PDU; and whether or not the re-segmented RLC UM PDU is a last re-segmented RLC UM PDU out of the two or more re-segmented RLC UM PDUs, are arranged to be indicated in a third octet of the header.

* * * * *